US008923152B2

United States Patent
Benkö et al.

(10) Patent No.: US 8,923,152 B2
(45) Date of Patent: Dec. 30, 2014

(54) RANDOM DATA STREAM SAMPLING

(75) Inventors: Péter Benkö, Budapest (HU); Andás Veres, Budapest (HU)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 47 days.

(21) Appl. No.: 13/512,666

(22) PCT Filed: Dec. 4, 2009

(86) PCT No.: PCT/EP2009/066438
§ 371 (c)(1),
(2), (4) Date: Jul. 16, 2012

(87) PCT Pub. No.: WO2011/066867
PCT Pub. Date: Jun. 9, 2011

(65) Prior Publication Data
US 2012/0275331 A1    Nov. 1, 2012

(51) Int. Cl.
*H04L 12/26* (2006.01)
(52) U.S. Cl.
CPC ............ *H04L 43/026* (2013.01); *H04L 43/028* (2013.01); *H04L 43/0829* (2013.01); *H04L 43/0852* (2013.01); *H04L 43/022* (2013.01)
USPC ...................................................... 370/252
(58) Field of Classification Search
USPC ....................... 370/241, 252, 231; 345/440
See application file for complete search history.

(56) References Cited

U.S. PATENT DOCUMENTS

| | | | | |
|---|---|---|---|---|
| 6,873,600 | B1* | 3/2005 | Duffield et al. | 370/252 |
| 7,251,215 | B1* | 7/2007 | Turner et al. | 370/231 |
| 2007/0147258 | A1* | 6/2007 | Mottishaw et al. | 370/241 |
| 2007/0244891 | A1* | 10/2007 | Gopalan et al. | 707/7 |
| 2008/0297513 | A1* | 12/2008 | Greenhill et al. | 345/440 |
| 2009/0232012 | A1* | 9/2009 | Zseby | 370/252 |

FOREIGN PATENT DOCUMENTS

EP    1729447 A1 * 12/2006

OTHER PUBLICATIONS

Jeffrey Scott Vitter. Random Sampling with a Reservoir. ACM Transactions on Mathematical Software, Mar. 1985, pp. 37-57 vol. 11, No. 1.

* cited by examiner

*Primary Examiner* — Chirag Shah
*Assistant Examiner* — Jael Ulysse
(74) *Attorney, Agent, or Firm* — Coats & Bennett, P.L.L.C.

(57) ABSTRACT

A method is disclosed for sampling data elements from a data stream that comprises a plurality of data elements, each data element having a respective unique quasi-random identifier determined from a set of identifiers. Data elements are selected from the data stream whose identifiers are within a first element selection range to obtain a set including a predefined number of selected data elements, the first element selection range being a subset of the set of identifiers. A second element selection range is determined as a proper subset of the first element selection range. Data elements are discarded from the set of selected data elements whose identifiers are not within the second element selection range. At least one further data element is selected from the data stream whose identifier is within the second element selection range for the set of selected data elements.

15 Claims, 4 Drawing Sheets

RANDOM DATA STREAM SAMPLING

TECHNICAL FIELD

The invention relates to random sampling, and in particular to a method and apparatus for randomly sampling data elements in a data stream.

BACKGROUND

Random sampling is widely used in database systems to select representative elements from a data set. The advantage of random sampling is that the analysis of the selected samples requires much less computational power and storage capacity than the processing of the entire data set. Nevertheless, provided that the samples are selected carefully, the results obtained can be statistically valid for the entire data set.

Stream sampling of data elements in a data stream is a special form of sampling where the number of elements in the source data set is not known a priori. This kind of sampling can be used, for example, in the real-time monitoring of the performance of packet streams in communication networks. In this example, a packet stream can be (i) all packets within a flow in an Internet Protocol (IP) network (identified by for example, the source, destination addresses, port numbers and protocol fields in the IP packets); or (ii) all packets transferred on a communication link during a specified time interval.

If a data stream is present in multiple physical/logical observation nodes (for example a packet stream will pass through a number of different nodes in a communication network), then it may be required to correlate the selected samples among these nodes. It can be necessary to keep track of the same data stream elements among multiple observation nodes in order to be able to calculate certain statistics for the sampled records. In a communication network these statistics can include the delay and loss ratio of the data packets.

One conventional sampling technique described in "Random Sampling with a Reservoir" ACM Transactions on Mathematical Software, 11(1), March 1985, 37-57 provides an upper bound for the number of samples to be selected from the data stream which helps to limit the memory and processing power required for the analysis of the samples, while making sure that the number of samples selected is statistically representative. This technique uses a fixed-size randomized sample set (a reservoir). However, the problem with this approach is that the sampling process is completely random, making the correlation of samples at different observation nodes impossible.

An alternative sampling technique (described in U.S. Pat. No. 6,873,600) focuses on packet stream sampling in a communication network and uses hashes for consistent packet selection. Hash functions are well known in the art as functions which convert a variable-sized input and return a fixed size output, for example a single integer. However, it is not possible for the number of samples taken to be upper bounded in this technique while making sure that the set of samples are statistically representative (i.e. while making sure that they are not all selected from an initial portion of the data stream), which makes the amount of sampled data hard to control.

Therefore, there is a need for a method and apparatus for data stream sampling that can be used in a communication network that overcomes the disadvantages with the known sampling techniques.

SUMMARY

According to a first aspect of the invention, there is provided a method of sampling data elements from a data stream for subsequent analysis, the data stream comprising a plurality of data elements, wherein each data element has a respective unique quasi-random identifier determined from a set of identifiers, the method comprising selecting data elements from the data stream whose identifiers are within a first element selection range to give a set of selected data elements, the first element selection range being a subset of the set of identifiers; and once the set of selected data elements comprises a predetermined number of data elements, the method further comprises determining a second element selection range as a proper subset of the first element selection range; discarding data elements from the set of selected data elements whose identifiers are not within the second element selection range; and selecting at least one further data element from the data stream whose identifier is within the second element selection range for the set of selected data elements.

Thus, the invention makes it possible to consistently select data elements from a data stream across multiple observation nodes while limiting the number of elements sampled from the stream, even where the number of data elements in the stream is not known a priori.

Preferably, the step of selecting at least one further data element comprises selecting further data elements from the data stream whose identifiers are within the second element selection range for the set of selected data elements until the data stream ends; or the selected set of data elements again comprises the predetermined number of data elements.

Preferably, in the event that the selected set of data elements again comprises the predetermined number of data elements, the method further comprises repeating the steps of determining, discarding and selecting at least one further data element. In this way, the method should result in the relatively uniform sampling of data elements across the data stream.

Preferably, the data elements whose identifiers are within the first element selection range are selected from an initial portion of the data stream, and wherein the at least one further data element is selected from a subsequent portion of the data stream.

In some embodiments, the method further comprises the step of determining the unique, quasi-random identifier for each data element from selected fields of the header and/or parts of the payload of the data element. This means that it is not necessary for data elements to have an intrinsic unique, quasi-random identifier and the invention can be applied to many different types of existing network.

Preferably, the step of determining the identifier comprises using a hash function and the selected fields of the header and/or parts of the payload of the data element are used as the argument to the hash function.

Preferably, the step of determining the second element selection range as a proper subset of the first element selection range is deterministic. The narrowing of the element selection range is done in a deterministic way to ensure consistent sampling across different sampling nodes.

Preferably, the step of determining the second element selection range comprises reducing the number of identifiers in the first element selection range by a narrowing factor that is between 10/9 and 2 as this range provides a good compromise between obtaining as close to the predetermined number of elements as possible, while keeping the required processing power down.

According to a second aspect of the invention, there is provided a method of sampling data elements from a data stream in multiple nodes of a network, the network comprising at least a first node and a second node, the data stream passing through each of the first node and the second node, the method comprising in the first node, performing the method described above to select data elements from the data stream; and in the second node, performing the method described above to select the same data elements from the data stream; wherein the first element selection range is identical for the first node and second node, and the step of determining a second element selection range is deterministic, so that each of the first node and second node determine the same second element selection range from the same first element selection range.

Preferably, each of the first node and second node determine the unique, quasi-random identifier for each data element from selected fields of the header and/or parts of the payload of the data element in the same way.

According to a third aspect of the invention, there is provided a method of analysing a data stream in a communication network, the method comprising sampling data elements from the data stream as described in the second aspect; determining information for the data elements in the selected set at each of the first node and the second node; and analysing the information for the data elements in the selected set.

Preferably, the Information for the selected data elements comprises the data element identifier, an arrival time at the node, a source address and/or a destination address.

Preferably, the step of analysing comprises determining statistics for the data stream from the information for the selected data elements.

According to a fourth aspect of the invention, there is provided a sampling apparatus for sampling data elements from a data stream for subsequent analysis, the data stream comprising a plurality of data elements, wherein each data element has a respective unique, quasi-random identifier determined from a set of identifiers, the sampling apparatus comprising a sample memory that is capable of storing at least a predetermined number of data elements; and a processor for selecting data elements from the data stream whose identifiers are within a first element selection range and storing the selected data elements in the sample memory, wherein the first element selection range is a subset of the set of identifiers; characterised in that, when the sample memory contains the predetermined number of data elements, the processor is configured to determine a second element selection range as a proper subset of the first element selection range; remove data elements from the sample memory whose identifiers are not within the second element selection range; and select at least one further data element from the data stream whose identifier is within the second element selection range and store the at least one further data element in the sample memory.

According to a fifth aspect of the invention, there is provided a computer program product having a computer readable medium with computer readable code embodied therein, the computer readable code being configured such that, upon execution by a suitable computer or processor, the computer or processor is caused to perform the method described above.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Although the invention will be described below with reference to the sampling of data stream elements at multiple nodes in a telecommunication network, it will be appreciated that the invention can be used to sample elements in a data stream in any type of network, whether wired or wireless, and it will also be appreciated that the invention can be used to randomly sample data elements at a single node.

Figure 1:
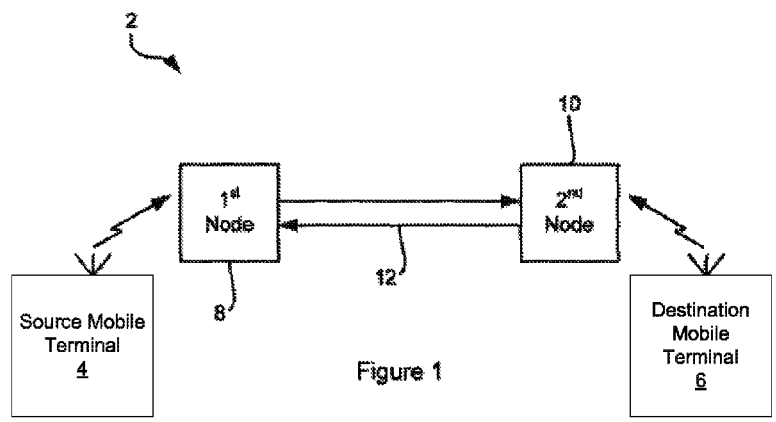
FIG. 1 is a block diagram of a telecommunication network in which the invention can be implemented.

An exemplary telecommunication network in which the invention can be implemented is shown in FIG. 1. The structure and operation of such networks are well known in the art, and will not be described in detail herein. For the purposes of explaining the invention, the telecommunication network 2 comprises a source mobile terminal 4 that transmits information in the form of a data stream comprising a plurality of data stream elements (for example Internet Protocol, IP, packets or other data packets) wirelessly to a destination mobile terminal 6.

In particular, the source mobile terminal 4 transmits the plurality of data stream elements wirelessly to a first node 8, which passes the data stream elements to a second node 10, as indicated by arrows 12. One or both of the first and second nodes 8, 10 can be, for example, base stations in the telecommunication network 2, or any other type of node that is found in a telecommunication network 2. It will further be appreciated that other network nodes are likely to be present between the first and second nodes 8, 10, but these have been omitted for simplicity. The second node 10 transmits the plurality of data stream elements to the destination mobile terminal 6.

The data stream can be a packet stream that contains packets within an IP flow in an Internet Protocol network (identified by, for example, the source, destination addresses, port numbers and protocol fields in the IP packets) or packets transferred on a communication link during a specified time interval.

In this illustrated embodiment, it is desired to obtain statistics on the communication path between the source mobile terminal 4 and the destination mobile terminal 6, such as the delay and rate of packet loss. To this end, sampling of the elements in the data stream is carried out by a sampling apparatus that is part of each of the first and second nodes 8, 10.

In alternative embodiments of the invention, the sampling apparatus can be part of alternative nodes in the telecommunication network 2 to the first and second nodes 8, 10.

Figure 2:
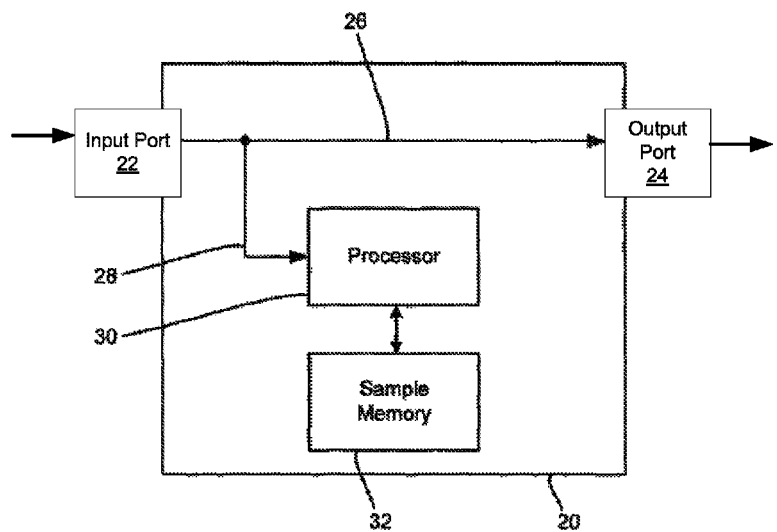
FIG. 2 is a block diagram of a sampling apparatus for randomly sampling elements in a data stream in the communication network according to an embodiment of the invention.

An exemplary sampling apparatus is shown in FIG. 2. The sampling apparatus 20 comprises an input port 22 for receiving the data stream, an output port 24 for outputting the data stream and a data line 26 that connects the input port 22 to the output port 24. The apparatus 20 further comprises a sampling line 28 that is connected to the data line 26 and that provides a copy of the data stream received at the input port 24 to a processor 30, and a sample memory 32 that is connected to the processor 30.

In accordance with the invention, the processor 30 selects or "samples" elements from the data stream at random and stores these in the sample memory 32. The algorithm used by the processor 30 to select the elements from the data stream is described in more detail below with reference to FIG. 3.

Firstly, as described above, it is necessary for the selection or sampling of elements from the data stream to be random, while providing the ability to select or sample those same elements in a different node of the network 2. To achieve this, each of the elements in the data stream must have an associated identifier.

The identifier must be unique as this allows individual elements to be identified at different sampling nodes, and the identifier should not provide any information about the element (for example its size, source, destination, position in the data stream, etc.) or its content to allow statistically representative sampling to take place.

Depending on the type of elements being used in the communication network 2, the data elements might already have such an identifier encoded or contained therein. In these embodiments, the data elements have predetermined identifiers randomly assigned thereto. However, in other implementations of the invention, for example in IP networks and networks that use IP packets, the elements in the data stream do not have an encoded identifier that satisfies all of the above requirements, and it is necessary to derive an identifier for each element.

In these cases, a function, such as a hash function, can be used to generate the identifier for each element. In particular, the hash function can determine the identifier for each element by using the data element or a part of the data element as its argument. For example, the hash function can operate on selected fields of the packet header and parts of the packet payload to generate the identifier. It will be appreciated that the hash function can only generate a unique identifier if the input to the hash function is also unique, but in practice, hash collision may occur (i.e. two identifiers might be the same), but the probability of this occurring is negligible. The hash function should be deterministic and well-mixing (i.e. the hash function's result should be a uniformly distributed quasi-random number), for example a Cyclic Redundancy Check (CRC) function.

The hash function or other similar type of function is used to generate the identifier by mapping individual data elements into a single deterministic (and therefore quasi-) random variable.

Quasi-random variables have two important properties: (i) their statistical properties are (ideally) identical to real random variables (for example in terms of mean, variance, probability distribution function, etc.); and (ii) they are deterministic, so that if you know the function used to generate the variable, you can generate the exact same variable, provided that the input to the function is the same.

The first property of quasi-random variables means that unbiased samples can be taken from the data stream, and the second property means that the same data elements can be identified at different points in the network 2.

In some embodiments, the identifier can be in the form of an integer. In the following, the identifiers are assumed to be in the range $[0, R_{ID})$, where $R_{ID}$ is an integer.

The sampling method according to the invention will now be described below with reference to the flow chart in FIG. 3.

In the first step, step 101, which can be performed during an initialization stage of the sampling apparatus 20 (for example when a new data stream is received), or even during manufacturing or installation of the sampling apparatus 20, the maximum number of data elements to be sampled from each data stream is set. This number is denoted $N_{max}$, and sets the upper bound on the number of elements to be sampled.

The maximum number of data elements, $N_{max}$, can be set based on the size of the sample memory 32, for example with $N_{max}$ being set equal to or less than the maximum number of samples or elements that can be stored in the sample memory 32.

Then, in step 103, which can again be performed during an initialization stage of the sampling apparatus 20 (for example when a new data stream is received), an initial data element selection range is determined from the total range of identifiers $[0, R_{ID})$. The initial data element selection range is denoted $S_0$, with $S_0 \subseteq [0, R_{ID})$, and with the probability of a particular element being selected or sampled denoted $p_0$. A data element selection range S used in the subsequent steps is set equal to $S_0$. An element selection probability p used in the subsequent steps is set equal to $p_0$.

Preferably, $S_0=[0, R_{ID})$, which means that the probability, $P_0$, of a particular element being selected or sampled is 1.

In step 105, an element $E_n$ of the data stream is received by the sampling apparatus 20, and in step 107, the processor 30 determines the unique identifier $ID_n$ of the element $E_n$.

As described above, each element in the data stream can include a unique identifier, in which case the processor 30 reads or decodes the identifier from the element $E_n$ in step 107. However, if the elements do not include unique identifiers, then the processor 30 determines the identifier in the appropriate way (for example by applying the relevant part of the element $E_n$ to the hash function). It will be appreciated that if the processor 30 is to determine the identifiers (for example because of the type of data elements used in the communication network 2), this requirement will be preprogrammed into the processor 30—it is not necessary for the processor 30 to determine that the data elements do not include unique identifiers.

Once the identifier $ID_n$ has been determined, the processor 30 determines whether the identifier $ID_n$ is within the data element selection range S.

If the identifier $ID_n$ is not within the data element selection range S, then the processor 30 discards the data element $E_n$ in step 111 (i.e. it is not stored in the sample memory 32), the process returns to step 105 and repeats for the next data stream element $E_{n+1}$.

It will be appreciated that although the processor 30 discards the data element $E_n$, this has no bearing on the continued transmission of the data element $E_n$ to the destination mobile terminal 6 as this occurs through data line 26.

If it is determined in step 109 that the identifier $ID_n$ is within the data element selection range S, then the processor 30 stores the data element $E_n$ in the sample memory 32 (step 113). As with the discard in step 111, the storage of the element $E_n$ in the sample memory 32 has no bearing on the continued transmission of the data element $E_n$ to the destination mobile terminal 6 as this occurs through data line 26.

Subsequently, in step 115, the processor 30 determines whether the number of data elements in the sample memory 32 is equal to the maximum number of elements to be sampled, $N_{max}$.

If the number of elements in the sample memory 32 is less than the maximum number of elements to be sampled, $N_{max}$, then the process returns to step 105 and repeats for the next data stream element $E_{n+1}$.

However, if the number of elements in the sample memory 32 is equal to the maximum number of elements to be sampled, $N_{max}$, then the process moves to step 117 where the processor 30 determines a new element selection range $S_{new}$ by narrowing the current element selection range, S, by a scaling factor, F. This results in a new element selection range $S_{new}$ that is a proper subset of the current element selection range S (i.e. $S_{new} \subset S$) and that contains S/F values. This leads to a new element selection probability of $p_{new}$=p/F. As set out below, the purpose of the narrowing of the element selection range and the use of the narrowed element selection range in subsequent steps is to allow up to an upper-bounded number of data elements to be selected from all data elements making up the data stream, while making sure that the selection of these data elements from the data stream is essentially random.

Clearly, F is greater than 1 in order for the range to be narrowed.

The narrowing of the current element selection range is done in a deterministic way to ensure consistent sampling across different sampling nodes. For example, the narrowing could result in the identities in the upper part of S being retained and the lower S-(S/F) identities being excluded from the new element selection range $S_{new}$. Alternatively, the narrowing could result in the identities in the middle or lower parts of S being retained. Those skilled in the art will be aware of many other deterministic ways in which the narrowing can be performed.

After the element selection range has been narrowed, the process moves to step 119. In step 119, each of the elements stored in the sample memory 32 is reassessed in view of the narrowed element selection range $S_{new}$. In particular, any element stored in the sample memory 32 whose identifier does not fall within the narrowed element selection range $S_{new}$ is discarded or deleted from the sample memory 32 (step 121). Any element whose identifier falls within the narrowed element selection range $S_{new}$ is retained in the sample memory 32.

In the unlikely event that no elements are discarded or deleted from the sample memory 32 in step 121, the algorithm returns to step 117 and the element selection range is narrowed again.

It will be noted here that the likelihood of retaining any particular element in the sample memory 32 will increase as the value of the scaling factor F approaches 1.

Then, in step 123, the element selection range S is set equal to $S_{new}$. The process then returns to step 105 where the next data stream element $E_{n+1}$ is received.

Steps 105 to 123 are repeated until the data stream ends. As a result of the above process, the sample memory 32 should contain elements that are relatively uniformly distributed across the data stream. It will be appreciated that the method in FIG. 3 can be performed as data elements are received at the node (i.e. steps 105 to 123 can be performed as each data element is received), or the method can be performed by temporarily storing a number of the data elements (for example a predetermined number of elements or the complete data stream) in a buffer (not shown in FIG. 2) and then performing steps 105 to 123 on each of the elements in the buffer in turn.

When the data stream ends, the number of samples in the sample memory 32 will be equal to or less than $N_{max}$ and generally more than $N_{max}$/F (although it is possible for the number of samples to be less than $N_{max}$/F if the last reassessment before the data stream ends results in more than $N_{max}$/F samples being deleted or discarded from the sample memory 32). If it is desired for the resulting number of elements in the sample memory 32 to be as close to $N_{max}$ as possible, then the value of F should be set to a low value (i.e. close to 1), although this will lead to frequent narrowing of the element selection range and reassessment of the elements in the sample memory 32. On the other hand, if it is desired that the sampling process should consume as little processing power as possible (i.e. by avoiding frequent narrowing of the element selection range), then the value of F should be set to a relatively high value. In a preferred embodiment, a value for F is selected from the range [10/9, 2], as this range provides a good compromise between obtaining as close to $N_{max}$ elements in the sample memory 32 as possible, while keeping the required processing power down.

In the illustrated embodiment, the sampling apparatus 20 in each of the first and second nodes 8, 10 performs the method described above. This results in both sampling apparatuses 20 storing the same set of data elements in the sample memory 32. The first and second nodes 8, 10 can forward the contents of the sample memory 32 (or data relating to the elements in the sample memory 32, such as the element's identifier, arrival time, source address, destination address, etc.) to a central node in the network 2 which can analyse the data to determine the required statistics, such as delay and rate of packet loss.

The operation of the algorithm described above in different logical/physical observation points or nodes in a network 2 means that a given data element will either be sampled at each of the different points or nodes or at none of them (of course it will be appreciated that this is not the case where a data element sampled at a first measurement node is lost or corrupted before reaching the second measurement node).

An exemplary operation of the invention described above is shown in FIG. 4. In this simplified example, the data stream comprises 24 elements, the initial element selection range $S_0$ is set equal to the range of identifiers [0, 999], the scaling factor F is 2 and the sample memory capacity, $N_{max}$, is 10. In addition, the narrowing operation in step 117 of FIG. 3 results in the upper part of the element selection range being retained). FIG. 4 shows three different states of the sample memory 32 (labeled (i), (ii) and (iii) respectively) as the process shown in FIG. 3 operates on the data stream.

The elements in the data stream are labeled consecutively E0 to E23, and each element has an associated three digit identifier (whether encoded therein or derived using a hash function) in the range [0, 999].

Figure 3:
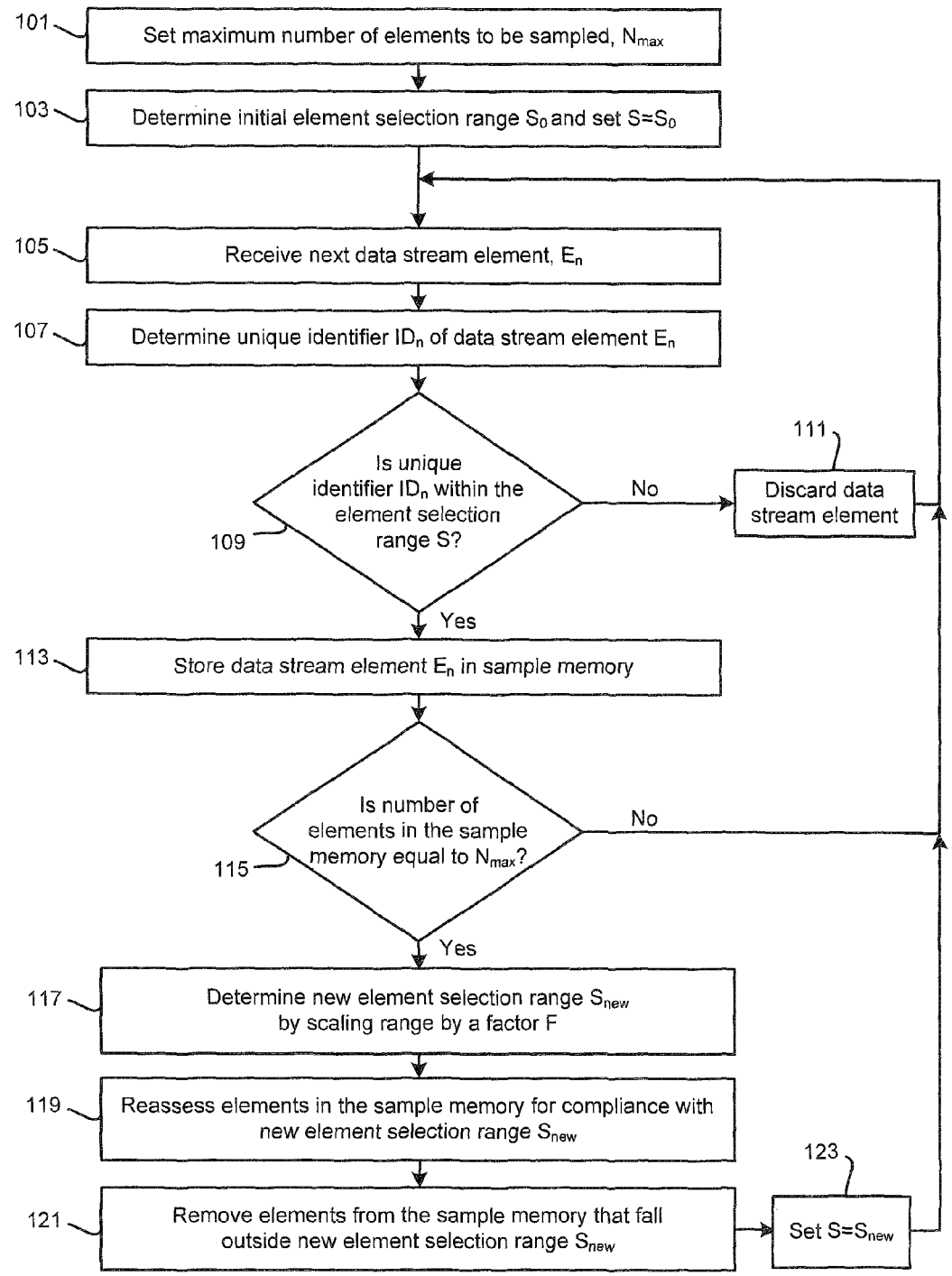
FIG. 3 is a flow chart illustrating the operation of the sampling apparatus in accordance with the invention.
Figure 4:
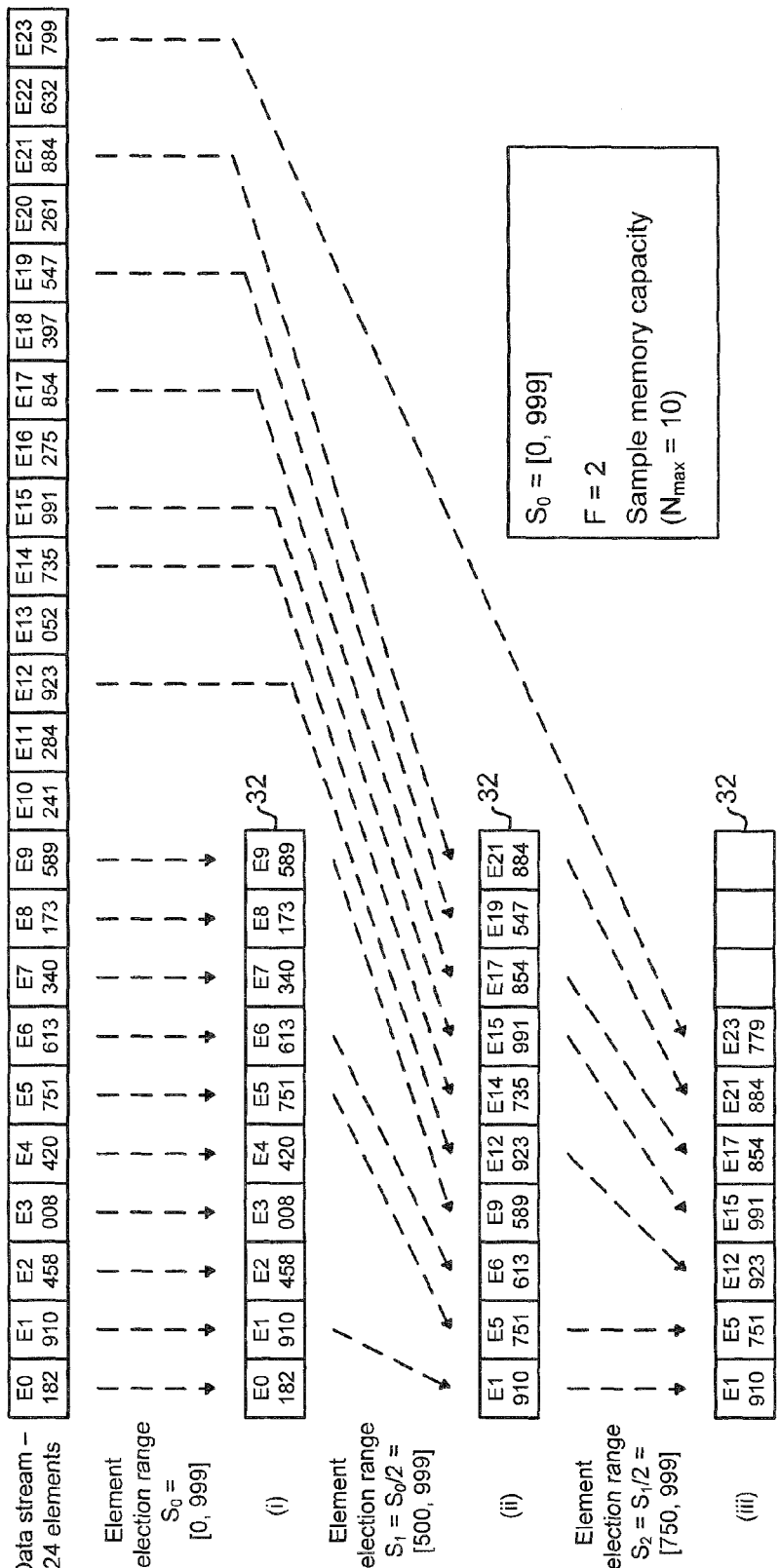
FIG. 4 is a diagram illustrating different states of the sampling memory of the sampling apparatus according to the invention.

Thus, following the method set out in steps 105 to 115 of FIG. 3, the first nine elements in the data stream (i.e. elements E0 to E8) are added to the sample memory 32 as the identifiers of these elements all lie in the element selection range $S=S_0=$[0, 999].

After the next element in the data stream (element E9) is added to the sample memory 32, the number of elements in the sample memory will be equal to $N_{max}$ (step 115). This is shown as state (i) in FIG. 4. Therefore, it is now necessary to narrow the element selection range by the scaling factor F (step 117) and reassess the elements in the sample memory 32 in view of the narrowed element selection range (step 119).

Thus, applying the scaling factor F (F=2) to the element selection range results in a narrowed element selection range $S_1=S_0/2=$[500, 999]. The identifiers of the elements in the sample memory 32 are compared to the narrowed element selection range $S_1$ and those not present in that range are discarded from the sample memory 32.

Thus, it can be seen in state (ii) of FIG. 4 that only elements E1, E5, E6 and E9 are retained in the sample memory 32 after the reassessment (step 119).

The process then returns to step 105 and repeats until sample memory 32 contains $N_{max}$ elements again. In particular, repeating steps 105 to 115 for elements E10 onwards results in elements E12, E14, E15, E17, E19 and E21 being added to the sample memory 32 (elements E10, E11, E13, E16, E18 and E20 having identifiers that are outside the element selection range ($S=S_{new}=S_1=[500, 999]$)). The state of the sample memory 32 at this stage is shown by state (ii) in FIG. 4.

Again, the element selection range is narrowed by the scaling factor F to give $S_2=[750, 999]$, and the elements in the sample memory 32 are reassessed in view of the narrowed element selection range (step 119). This reassessment results in elements E6, E9, E14 and E19 being discarded from the sample memory 32 and elements E1, E5, E12, E15, E17 and E21 being retained (shown in state (iii) of FIG. 4).

The process then returns to step 105 and repeats, resulting in element E23 being added to the sample memory 32 as its identifier lies within the element selection range ($S=S_2=[750, 999]$).

The data stream ends after element E23, which means that the process results in elements E1, E5, E15, E17, E21 and E23 being sampled (shown in state (iii) of FIG. 4).

It will be appreciated that the above example could be performed in any node of a network and it would result in the same set of elements being selected for sampling, thereby allowing statistics on the communication path between the nodes to be determined.

Figure 5:
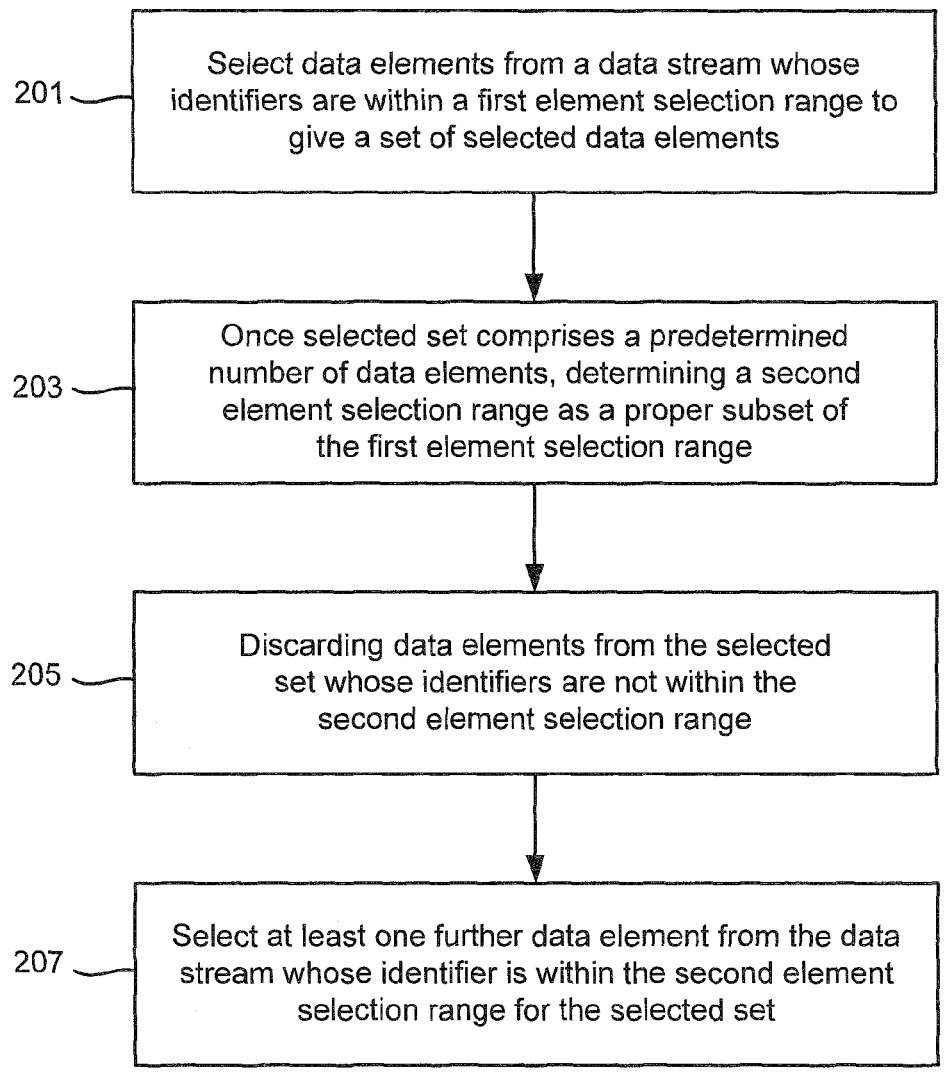
FIG. 5 is a flow chart illustrating a method according to the invention.

FIG. 5 shows a method in accordance with the invention that can be performed in nodes of the communication network 2 to sample data elements from a data stream. As described above, each data element has a respective unique quasi-random identifier determined from a set of identifiers, with the identifier being intrinsic to the data element, or being determined by applying the data element or a part of the data element to a function, such as a hash function.

In step 201, which corresponds to step 109 in FIG. 3, data elements in the data stream whose identifiers are within a first element selection range are selected. The selected data elements form a selected set.

Once the selected set comprises a predetermined number of data elements (the determination of which is done as set out in step 115 of FIG. 3), then a second element selection range is determined as a proper subset of the first element selection range (step 203, which corresponds to step 117 in FIG. 3).

The data elements in the selected set are then reassessed in light of the second element selection range, and any data element in the selected set whose identifier is not within the second element selection range is removed from the selected set (step 205). This step corresponds to steps 119 and 121 in FIG. 3.

Then, in step 207, further data elements in the data stream are assessed in view of the second element selection range and at least one further data element is selected for the selected set whose identifier is within the second element selection range. This step corresponds to step 109 in FIG. 3.

As described above, the process set out in FIG. 3 and FIG. 5 makes it possible to consistently select elements from a data stream across multiple observation nodes while limiting the number of elements sampled from the stream, even where the number of data elements in the stream is not known a priori. It is also possible to apply the sampling method to multiple data streams at once (for example respective data streams from a plurality of mobile terminals that are associated with the first node 8). In this way, the amount of processing and storage capacity required is proportional to the number of streams and not to the overall number of data elements in the streams.

When the invention is applied in a telecommunication network as in the exemplary embodiment described above, the invention makes it possible to reduce the amount of processing and storage capacity required for analyzing data streams across multiple measurement points.

It will be appreciated that although the invention has been described in terms of a sampling apparatus comprising specific hardware, the invention can be implemented without requiring additional hardware, for example by programming an existing processor to perform the method shown in FIG. 3 or FIG. 5. Moreover, the invention can be implemented in the form of a sensor that monitors the stream of data elements.

There is therefore provided a method and apparatus for data stream sampling that can be used in a communication network that overcomes the disadvantages with the known sampling techniques.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope. A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. A method implemented by a sampling apparatus for sampling data elements from a data stream for subsequent analysis, the data stream comprising a plurality of data elements each having a respective unique quasi-random identifier determined from a set of identifiers, the method comprising:

selecting data elements from the data stream whose identifiers are within a first element selection range to obtain a set including a predefined number of selected data elements, the first element selection range being a subset of the set of identifiers;

determining a second element selection range that is a proper subset of the first element selection range;

discarding data elements from the set of selected data elements whose identifiers are not within the second element selection range; and selecting at least one further data element from the data stream whose identifier is within the second element selection range for inclusion in the set of selected data elements, wherein the at least one further data element is not already included in the set of selected data elements.

2. The method of claim 1, wherein the selecting at least one further data element comprises selecting further data elements from the data stream whose identifiers are within the second element selection range for the set of selected data elements until: the data stream ends; or the selected set of data elements again comprises the predetermined number of data elements.

3. The method of claim 2, further comprising, in response to the selected set of data elements again comprising the predetermined number of data elements, repeating the determining, discarding, and selecting.

4. The method of claim 1, wherein the data elements whose identifiers are within the first element selection range are selected from an initial portion of the data stream; wherein the at least one further data element is selected from a subsequent portion of the data stream.

5. The method of claim 1, further comprising determining the unique, quasi-random identifier for each data element from selected fields of a header, parts of a payload of the data element, or both.

6. The method of claim 5, determining the unique, quasi-random identifier comprises using a hash function; wherein an argument of the hash function comprises the selected fields of the header, the parts of the payload of the data element, or both.

7. The method of claim 1, wherein the determination of the second element selection range as a proper subset of the first element selection range is deterministic.

8. The method of claim 1, wherein determining the second element selection range comprises reducing the number of identifiers in the first element selection range by a narrowing factor that is between 10/9 and 2.

9. The method of claim 1, wherein the method of sampling data elements from a data stream for subsequent analysis is performed in each of a first node and a second node in a communication network, with the data stream passing through each of the first node and the second node; wherein the first element selection range is identical for the first node and second node and the data elements selected by the first and second nodes are the same; and wherein determining a second element selection range is deterministic, so that each of the first node and second node determine the same second element selection range from the same first element selection range.

10. The method of claim 9, wherein each of the first node and second node determine the unique, quasi-random identifier for each data element from selected fields of the header, parts of the payload of the data element, or both, in the same way.

11. The method of claim 9, further comprising:
determining information for the data elements in the selected set at each of the first node and the second node; and analyzing the information for the data elements in the selected set.

12. The method of claim 11, wherein the information for the selected data elements comprises the data element identifier, an arrival time at the node, and at least one of a source address and a destination address.

13. The method of claim 12, wherein analyzing the information for the data elements in the selected set comprises determining statistics for the data stream from the information for the selected data elements.

14. A sampling apparatus for sampling data elements from a data stream for subsequent analysis, the data stream comprising a plurality of data elements each having a respective unique, quasi-random identifier determined from a set of identifiers, the sampling apparatus comprising:
a sample memory that is configured to store at least a predetermined number of data elements; and a processor configured to:
select the predefined number data elements from the data stream whose identifiers are within a first element selection range, wherein the first element selection range is a subset of the set of identifiers;
store the selected data elements in the sample memory;
determine a second element selection range as a proper subset of the first element selection range;
remove data elements from the sample memory whose identifiers are not within the second element selection range;
select at least one further data element from the data stream whose identifier is within the second element selection range for inclusion in the set of selected data elements, wherein the at least one further data element is not already included in the set of selected data elements; and
store the at least one further data element in the sample memory.

15. A computer program product stored in a non-transitory computer readable medium, the computer program product comprising program instructions for sampling data elements from a data stream for subsequent analysis, the data stream comprising a plurality of data elements each having a respective unique quasi-random identifier determined from a set of identifiers, the computer program product comprising computer program code which, when executed by a processor of a sampling apparatus, causes the sampling apparatus to:
select data elements from the data stream whose identifiers are within a first element selection range to obtain a set including a predetermined number of selected data elements, the first element selection range being a subset of the set of identifiers;
determine a second element selection range that is a proper subset of the first element selection range;
discard data elements from the set of selected data elements whose identifiers are not within the second element selection range; and
select at least one further data element from the data stream whose identifier is within the second element selection range for inclusion in the set of selected data elements, wherein the at least one further data element is not already included in the set of selected data elements.

* * * * *

UNITED STATES PATENT AND TRADEMARK OFFICE
CERTIFICATE OF CORRECTION

PATENT NO. : 8,923,152 B2
APPLICATION NO. : 13/512666
DATED : December 30, 2014
INVENTOR(S) : Benkő et al.

It is certified that error appears in the above-identified patent and that said Letters Patent is hereby corrected as shown below:

On the title page,

Item (12), under "United States Patent", Line 1, delete "Benkö et al." and insert -- Benkő et al. --, therefor.

Item (75), under "Inventors", in Column 1, Line 1, delete "Benkö," and insert -- Benkő, --, therefor.

Item (75), under "Inventors", in Column 1, Line 1, delete "Andás" and insert -- András --, therefor.

In the specification,

In Column 4, Line 65, delete "port 24" and insert -- port 22 --, therefor.

In Column 5, Line 60, delete "[0, $R_{ID}$])," and insert -- [0, $R_{ID}$], --, therefor.

In Column 6, Line 12, delete "[0, $R_{ID}$])." and insert -- [0, $R_{ID}$]. --, therefor.

In Column 6, Line 13, delete "[0, $R_{ID}$])," and insert -- [0, $R_{ID}$], --, therefor.

In Column 6, Line 18, delete "$S_0$=[0, $R_{ID}$])," and insert -- $S_0$=[0, $R_{ID}$], --, therefor.

In the claims,

In Column 11, Line 5, in Claim 6, delete "determining" and insert -- wherein determining --, therefor.

In Column 12, Line 7, in Claim 14, delete "number data" and insert -- number of data --, therefor.

Signed and Sealed this
Fifteenth Day of March, 2016

Michelle K. Lee
*Director of the United States Patent and Trademark Office*